US012585548B2

(12) United States Patent <br> Voropaev et al.

(10) Patent No.: US 12,585,548 B2 <br> (45) Date of Patent: Mar. 24, 2026

(54) ACTIVITY-BASED SNAPSHOT CREATION

(71) Applicant: Dell Products, L.P., Hopkinton, MA (US)

(72) Inventors: Andrey Voropaev, Warsaw (PL); Evan Jones, Glenville, NY (US); Douglas LeCrone, Hopkinton, MA (US)

(73) Assignee: Dell Products, L.P., Hopkinton, MA (US)

( * ) Notice: Subject to any disclaimer, the term of this patent is extended or adjusted under 35 U.S.C. 154(b) by 59 days.

(21) Appl. No.: 18/655,400

(22) Filed: May 6, 2024

(65) Prior Publication Data

US 2025/0342089 A1 Nov. 6, 2025

(51) Int. Cl.
| | |
|---|---|
| *G06F 11/10* | (2006.01) |
| *G06F 11/1446* | (2026.01) |
| *G06F 11/30* | (2006.01) |

(52) U.S. Cl.
CPC ...... *G06F 11/1461* (2013.01); *G06F 11/1451* (2013.01); *G06F 11/3034* (2013.01)

(58) Field of Classification Search
None
See application file for complete search history.

(56) References Cited

U.S. PATENT DOCUMENTS

| | | | | |
|---|---|---|---|---|
| 2019/0179717 A1* | 6/2019 | Juniwal | .................. | G06F 3/065 |
| 2021/0081284 A1* | 3/2021 | Watt | ..................... | G06F 11/076 |
| 2022/0382638 A1* | 12/2022 | Martin | ................ | G06F 12/1009 |
| 2024/0320102 A1* | 9/2024 | Wilcock | .............. | G06F 11/1451 |
| 2025/0021604 A1* | 1/2025 | Massri | ................ | G06F 16/2477 |

* cited by examiner

*Primary Examiner* — Jau Shya Meng

(74) *Attorney, Agent, or Firm* — Anderson Gorecki LLP

(57) ABSTRACT

Write IO operations on a set of storage volumes of a storage volume group are monitored, and one or more activity-based snapshot creation write IO thresholds are used to identify triggering events to create snapshots of the set of storage volumes. Activity-based snapshot creation write IO thresholds may be based on a total number of write IO operations that must occur on the set of storage volumes prior to creation of a snapset, on an average number of write IO operations that must occur on the set of storage volumes prior to creation of a snapset, a minimum number of write IO operations that must occur on each of the storage volumes prior to creation of a snapset, a maximum number of write IO operations that may occur on any one of the storage volumes prior to creation of a snapset, or a combination of write IO thresholds.

18 Claims, 6 Drawing Sheets

FIG. 5A

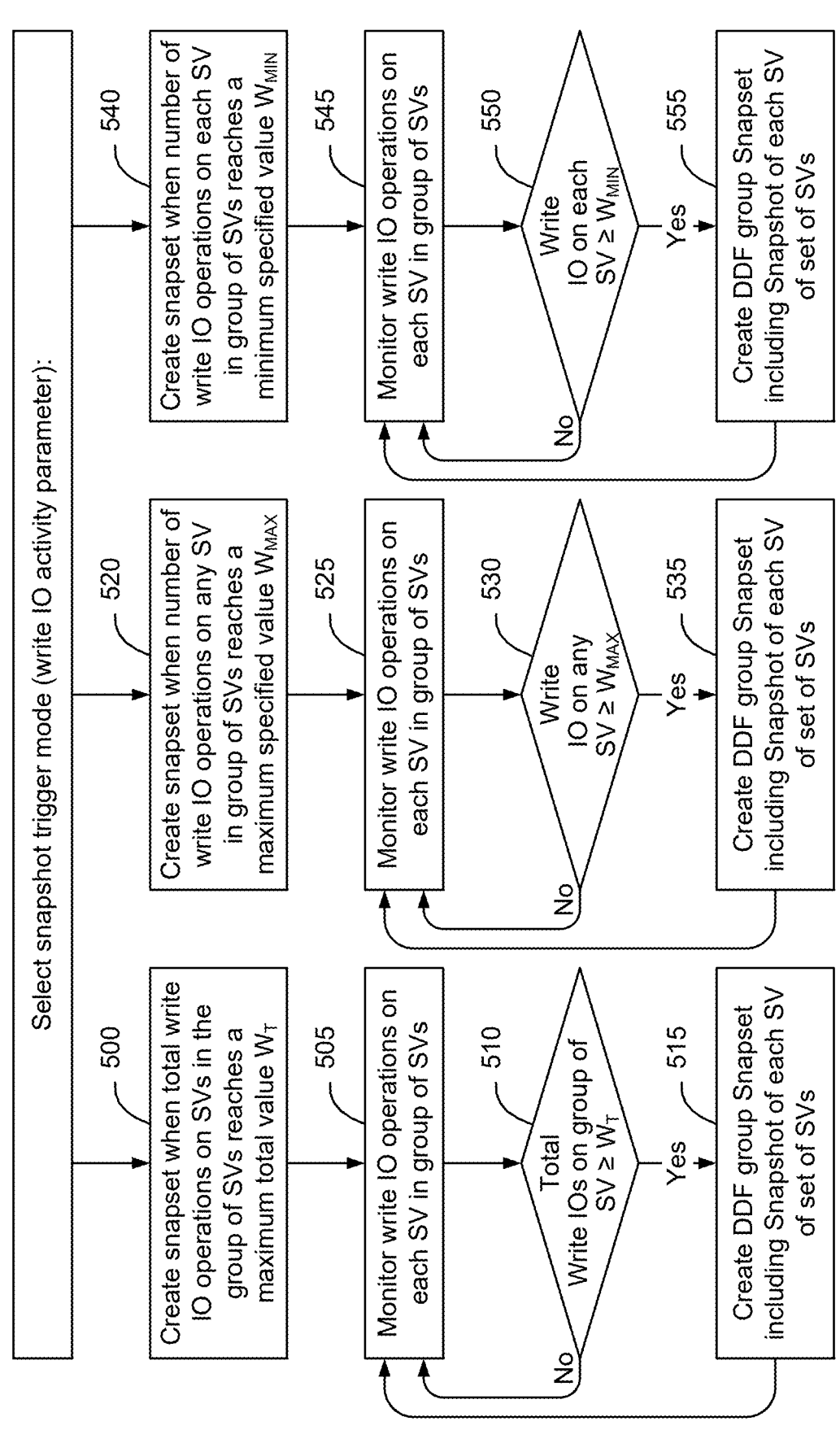

Select snapshot trigger mode (write IO activity parameter):

540 — Create snapset when number of write IO operations on each SV in group of SVs reaches a minimum specified value $W_{MIN}$

545 — Monitor write IO operations on each SV in group of SVs

550 — Write IO on each SV $\geq W_{MIN}$ — No / Yes

555 — Create DDF group Snapset including Snapshot of each SV of set of SVs

520 — Create snapset when number of write IO operations on any SV in group of SVs reaches a maximum specified value $W_{MAX}$

525 — Monitor write IO operations on each SV in group of SVs

530 — Write IO on any SV $\geq W_{MAX}$ — No / Yes

535 — Create DDF group Snapset including Snapshot of each SV of set of SVs

500 — Create snapset when total write IO operations on SVs in the group of SVs reaches a maximum total value $W_T$

505 — Monitor write IO operations on each SV in group of SVs

510 — Total Write IOs on group of SV $\geq W_T$ — No / Yes

515 — Create DDF group Snapset including Snapshot of each SV of set of SVs

ACTIVITY-BASED SNAPSHOT CREATION

FIELD

This disclosure relates to computing systems and related devices and methods, and, more particularly, to a method and apparatus for activity-based snapshot creation.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus activity-based snapshot creation is provided. Rather than specifying the creation of snapshots of a set of storage volumes on a periodic basis upon expiration of a fixed amount of time, one or more activity-based write IO operation thresholds is specified for the group of storage volumes. Write IO operations on the set of storage volumes of the group of storage volumes are monitored, and the one or more activity-based write IO thresholds are used to identify triggering events for creation of a snapshots of the set of storage volumes. In some embodiments, multiple snapshot triggering modes are available and able to be selected to be used to trigger creation of snapshots of a set of storage volumes. Example snapshot triggering modes include setting a snapshot creation write IO threshold based on a total number of write IO on the set of storage volumes, setting a snapshot creation write IO threshold based on an average number of write IO operations on the set of storage volumes, setting a snapshot creation write IO threshold based on a minimum number of write IO operations that must occur on each of the storage volumes of the set of storage volumes, and setting a snapshot creation write IO threshold based on a maximum number of write IO operations that may occur on any one storage volume of the set of storage volumes. Combinations of snapshot creation write IO thresholds may be used as well, depending on the implementation. In some embodiments, the snapshot triggering mode is a user-settable parameter to provide the user with control over what types of activity patterns on the set of storage volumes should trigger creation of a set of snapshots of the set of storage volumes. In some embodiments, the snapshot triggering mode is a user-settable parameter that is selected for each differential data facility monitoring group of storage volumes.

In some embodiments, a method of activity-based snapshot creation, includes defining a storage volume monitoring group, the storage volume monitoring group including one or more storage volumes, and setting a snapshot creation write IO threshold for the storage volume monitoring group, the snapshot creation write IO threshold specifying a write IO activity parameter for the storage volume monitoring group such that satisfying the write IO activity parameter results in creation of a set of snapshots of the storage volumes of the storage volume monitoring group. The method also includes monitoring write IO operations on the set of storage volumes of the storage volume monitoring group, comparing the monitored write IO operations with the snapshot creation write IO threshold, and in response to a determination that the monitored IO operations on the set of storage volumes of the storage volume monitoring group satisfy the write IO activity parameter, causing the creation of a set of snapshots of the storage volumes of the storage volume monitoring group.

In some embodiments, the storage volume monitoring group includes only a single storage volume, and the write IO activity parameter is a total number of write IO operations on the single storage volume.

In some embodiments, the storage volume monitoring group includes two or more storage volumes, and the write IO activity parameter is a maximum total number of write IO operations on the set of two or more storage volumes. In response to a determination that the monitored write IO operations on the set of two or more storage volumes of the storage volume monitoring group is equal to or greater than the maximum total number of write IO operations, causing the creation of a set of snapshots of the two or more storage volumes of the storage volume monitoring group.

In some embodiments, the storage volume monitoring group includes two or more storage volumes, and the write IO activity parameter is an average number of write IO operations on the set of two or more storage volumes. In response to a determination that the monitored IO operations on the set of two or more storage volumes of the storage volume monitoring group is equal to or greater than the average number of write IO operations, causing the creation of a set of snapshots of the two or more storage volumes of the storage volume monitoring group.

In some embodiments, the storage volume monitoring group includes two or more storage volumes, and the write IO activity parameter is a maximum number of write IO operations that may occur on any one of the set of two or more storage volumes. In response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

In some embodiments, the storage volume monitoring group includes two or more storage volumes, and the write IO activity parameter is a minimum number of write IO operations that must occur on each storage volume of the set of two or more storage volumes. In response to a determination that the monitored IO operations on each storage volume of the set of two or more storage volumes of the storage volume monitoring group is equal to or greater than the minimum number of write IO operations, causing the creation of a set of snapshots of the two or more storage volumes of the storage volume monitoring group.

In some embodiments, the storage volume monitoring group includes two or more storage volumes, and the write IO activity parameter is a combination of a minimum number of write IO operations that must occur on each storage volume of the set of two or more storage volumes or a maximum number of write IO operations that may occur on any one of the set of two or more storage volumes. In response to a determination that the monitored IO operations on each storage volume of the set of two or more storage volumes of the storage volume monitoring group is equal to or greater than the minimum number of write IO operations, or in response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

In some embodiments, the storage volume monitoring group includes two or more storage volumes, and the write IO activity parameter for the storage volume monitoring group is a user-settable parameter.

In some embodiments, monitoring write IO operations on the set of storage volumes of the storage volume monitoring group includes implementing a bitmap for each storage volume, with each bit of a respective bitmap representing a track of the storage volume, and a respective bit of the bitmap is changed when an initial write IO occurs on the respective track of the storage volume. In some embodiments, the bits of the bitmap identify tracks of the storage volumes that have changed since creation of a previous set of snapshots of the storage volumes of the storage volume monitoring group, and the bitmaps are reset after creation of the set of snapshots of the storage volumes of the storage volume monitoring group.

BRIEF DESCRIPTION OF THE DRAWINGS

FIG. 2 includes timeline showing example write IO operations (black dots) occurring on storage volumes of the storage volume monitoring (DDF) group over time, and shows an example of activity-based snapshot creation, according to some embodiments.

FIGS. 5A-5B are a flow chart of an example process of selecting a snapshot trigger mode, setting write IO operation DDF thresholds, and using the set write IO operation DDF thresholds in connection with implementing activity-based snapshot creation, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
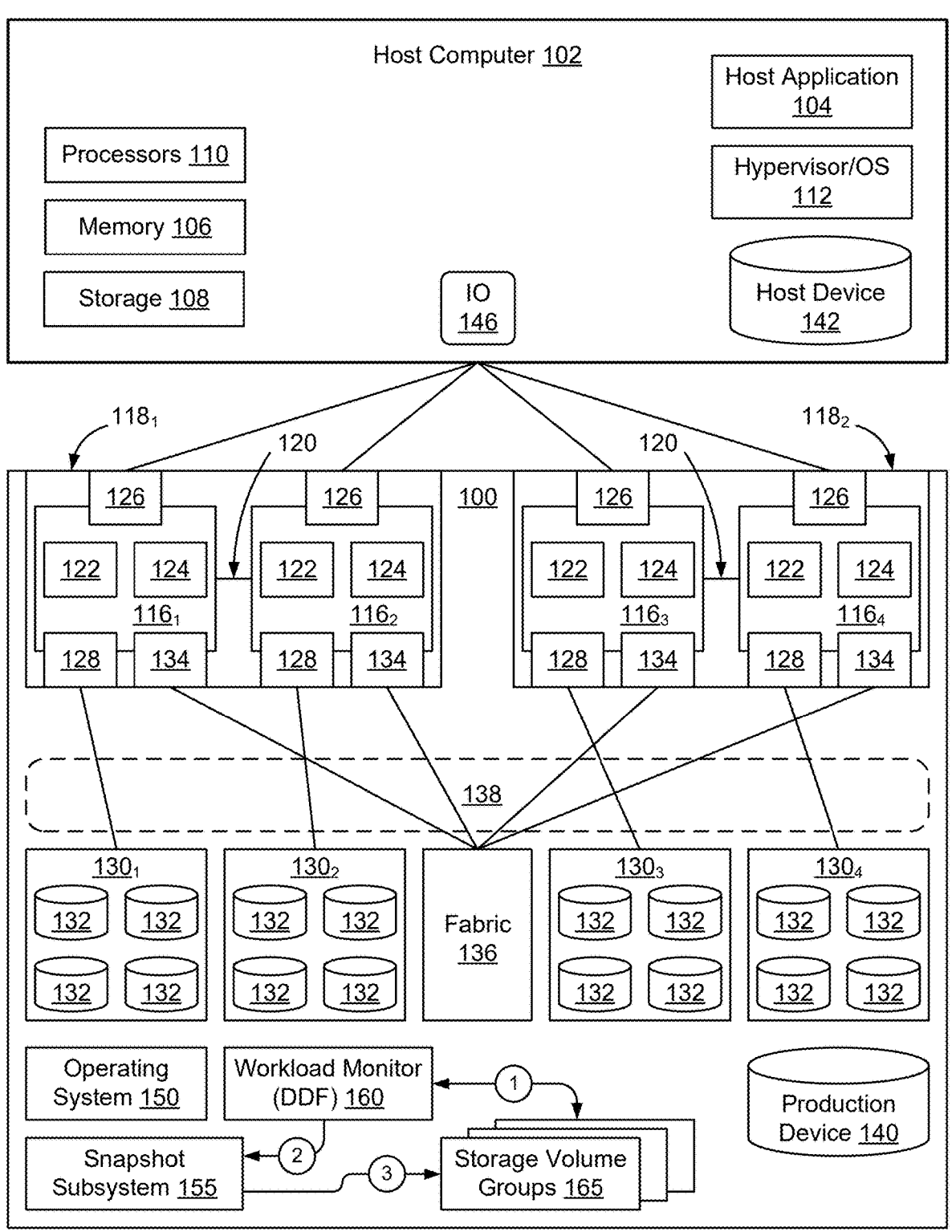
FIG. 1 is a functional block diagram of a host computer connected to an example storage system configured to implement activity-based snapshot creation, according to some embodiments.

FIG. 1 is a functional block diagram of a host computer connected to an example storage system, according to some embodiments. FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some embodiments the storage system includes a snapshot subsystem 155 configured to create point-in-time copies of storage volumes. As used herein, the term "snapshot" is used to refer to a point-in-time copy of data of a storage volume. In some embodiments, snapshots have references to all tracks of the storage volume. Accordingly, in instances where there are changes to a storage volume between creation of successive snapshots, the later created snapshot will capture the differential changes to the storage volume that have occurred since creation of the previous snapshot, while continuing to include references to all tracks of the storage volume.

Conventionally, the snapshot subsystem 155 would enable a user to specify how often the snapshots should be created. Specifically, in some embodiments a time interval would be specified for a storage volume or set of storage volumes such that, upon expiration of the specified time interval, the snapshot subsystem 155 would create a snapshot of the storage volume or would create a snapshot of each storage volume of the set of storage volumes. For example, the snapshot subsystem 155 could be instructed to create snapshots every 5 minutes, every 10 minutes, every 2 hours, etc. Upon expiration of the specified time period, the snapshot subsystem 155 would create a snapshot of each of the corresponding storage volume(s).

According to some embodiments, rather than specifying a frequency (rather than specifying an amount of time) between creation of successive snapshots, a workload monitor 160 is used to monitor write IO activity on a set of storage volumes of a storage volume monitoring group 165 (FIG. 1, arrow 1). One or more activity-based write IO operation thresholds is specified for the group of storage volumes in the workload monitor. Upon a determination that one or more of the activity-based write IO operation thresholds has been achieved, the workload monitor 160 instructs the snapshot subsystem 155 (FIG. 1, arrow 2) to create a snapshot of each storage volume of the set of storage volumes (FIG. 1, arrow 3). In some embodiments, the workload monitor is implemented as part of a Differential Data Facility (DDF) monitoring system that is used by the snapshot subsystem 155 to identify tracks that have changed between successive snapshots.

By implementing write IO operation active-based thresholds, and causing creation of snapshots in response to determination that activity on the storage volumes has reached the specified thresholds, it is possible to avoid creating snapshots during periods where the activity levels on the storage volumes is very low and it is possible to create snapshots more frequently during periods of high workload. Specifically, there could be time intervals where the storage volumes are not receiving any write IO operations. Using a time-based snapshot creation triggering system, in which the snapshot subsystem 155 creates snapshots upon expiration of a set period of time, it would be possible to create snapshots having little or no new data, resulting in wasteful snapshots. Conversely, in time intervals where there is exceedingly high write IO activity, waiting for expiration of the time interval could result in a snapshot with millions of changed tracks, which doesn't adequately protect the storage volume. By using activity-based snapshot creation, it is possible to avoid creation of wasteful snapshots, while ensuring that sufficient snapshots are created to ensure a sufficiently fine granularity of recovery points for the storage volume.

Figure 2:
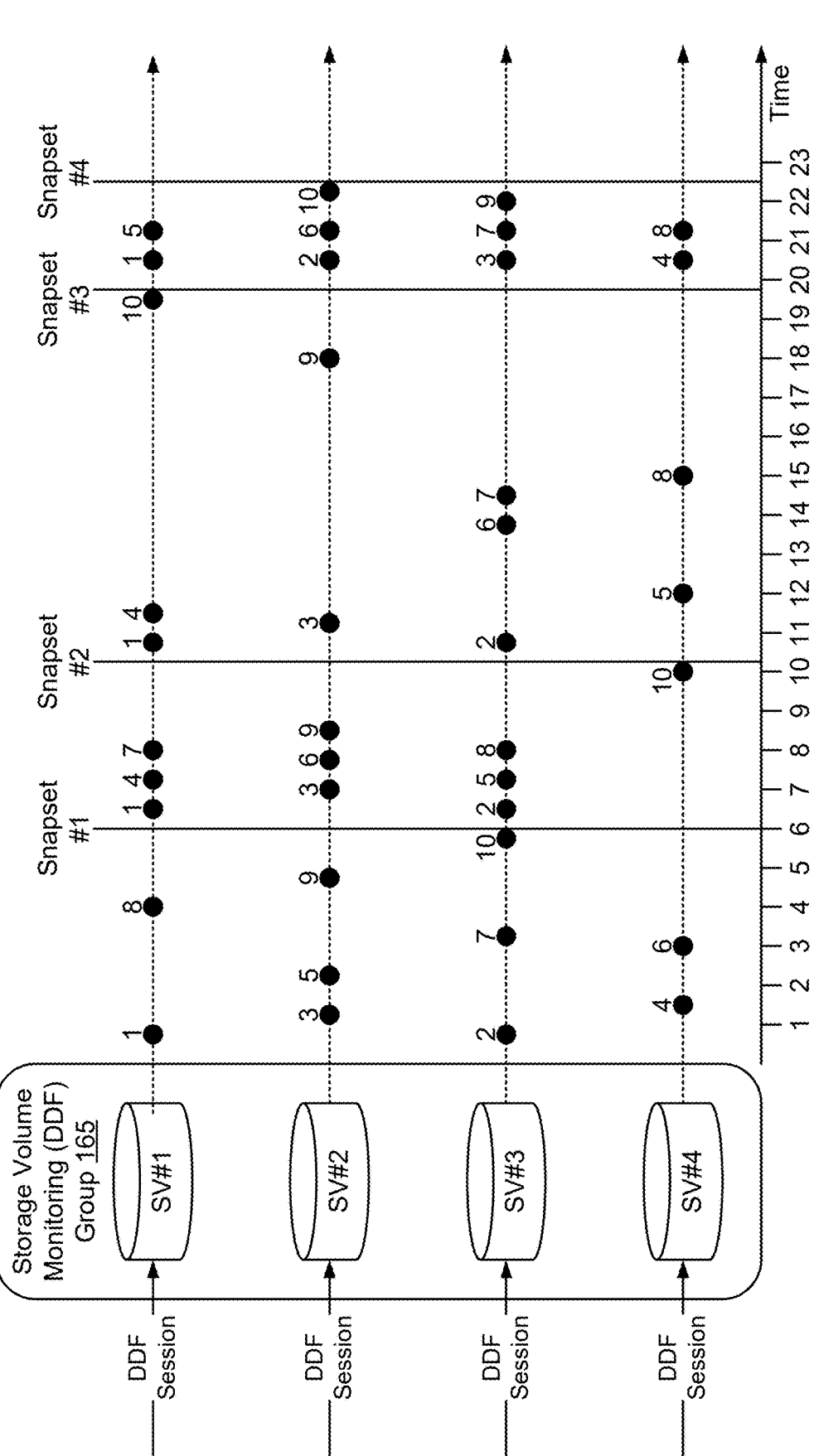
FIG. 2 is a block diagram of an example storage volume monitoring Differential Data Facility (DDF) group, according to some embodiments.

FIG. 2 is a block diagram of an example storage volume monitoring Differential Data Facility (DDF) group, according to some embodiments. As shown in FIG. 2, in some embodiments, a Differential Data Facility (DDF) session is established for each storage volume of a set of storage volumes of the storage volume monitoring group 165. In some embodiments, the storage system 100 includes a DDF monitoring system (workload monitor 160) that is used by the snapshot subsystem 155 to identify tracks that have changed since creation of a previous snapshot. In some embodiments the snapshot subsystem 155 creates snapshots that include the differential changes to the storage volume that have occurred since creation of the previous snapshot. The DDF session, in some embodiments, is used to identify tracks of the storage volume that have changed since creation of a previous snapshot, so that the snapshot subsystem knows what tracks have changed when it creates the snapshot.

Accordingly, as shown in FIG. 2, in some embodiments a storage volume monitoring group 165 is created to include a set of storage volumes. In the illustrated example there are 4 storage volumes, although it should be understood that the storage volume monitoring group could include any number of storage volumes N, where N is an integer greater than or equal to one.

FIG. 2 also includes a timeline showing example write IO operations (black dots) occurring on storage volumes of the storage volume monitoring (DDF) group over time, and shows an example of activity-based snapshot creation, according to some embodiments. The timeline does not include units, since the snapshots are not being created based on expiration of time. Accordingly, the time intervals on the timeline may be seconds, minutes, or other intervals of time depending on the implementation.

In the example shown in FIG. 2, an activity-based snapshot creation write IO threshold has been set such that snapshots are created whenever a total number of ten write IO operations has been implemented collectively on the set of four storage volumes $W_T=10$. Other activity-based thresholds could be specified as well, but for ease of illustration this particular write IO threshold has been selected for this example. As shown in FIG. 2, using this selected write IO threshold $W_T=10$, snapshot #1 is created after receipt of 10 write IO operations at time interval #6. Snapshot #2 is created after receipt of the next 10 write IO operations, just after time interval #10. Whereas it took 6 time intervals to receive 10 write IO operations to trigger creation of snapshot #1, it took only just over 4 time intervals to receive a subsequent 10 write IO operations to trigger creation of snapshot #2. Likewise, in the example shown in FIG. 2, the next 10 write IO operations are implemented on the set of storage volumes over a subsequent almost 9 time intervals which causes creation of snapset #3 just before time interval #20. Snapset #4 is created just after time interval #22.

As shown in FIG. 2, during periods where there are more frequent write IOs on the set of storage volumes, snapsets are created more frequently, and during periods of less frequent write IOs, snapsets are created less frequently. By creating snapsets based on write activity on the set of storage volumes, it is also possible to cause creation of snapsets having a consistent number of changed tracks, without causing creation of snapsets having too few or too many changed tracks of data.

Figure 3:
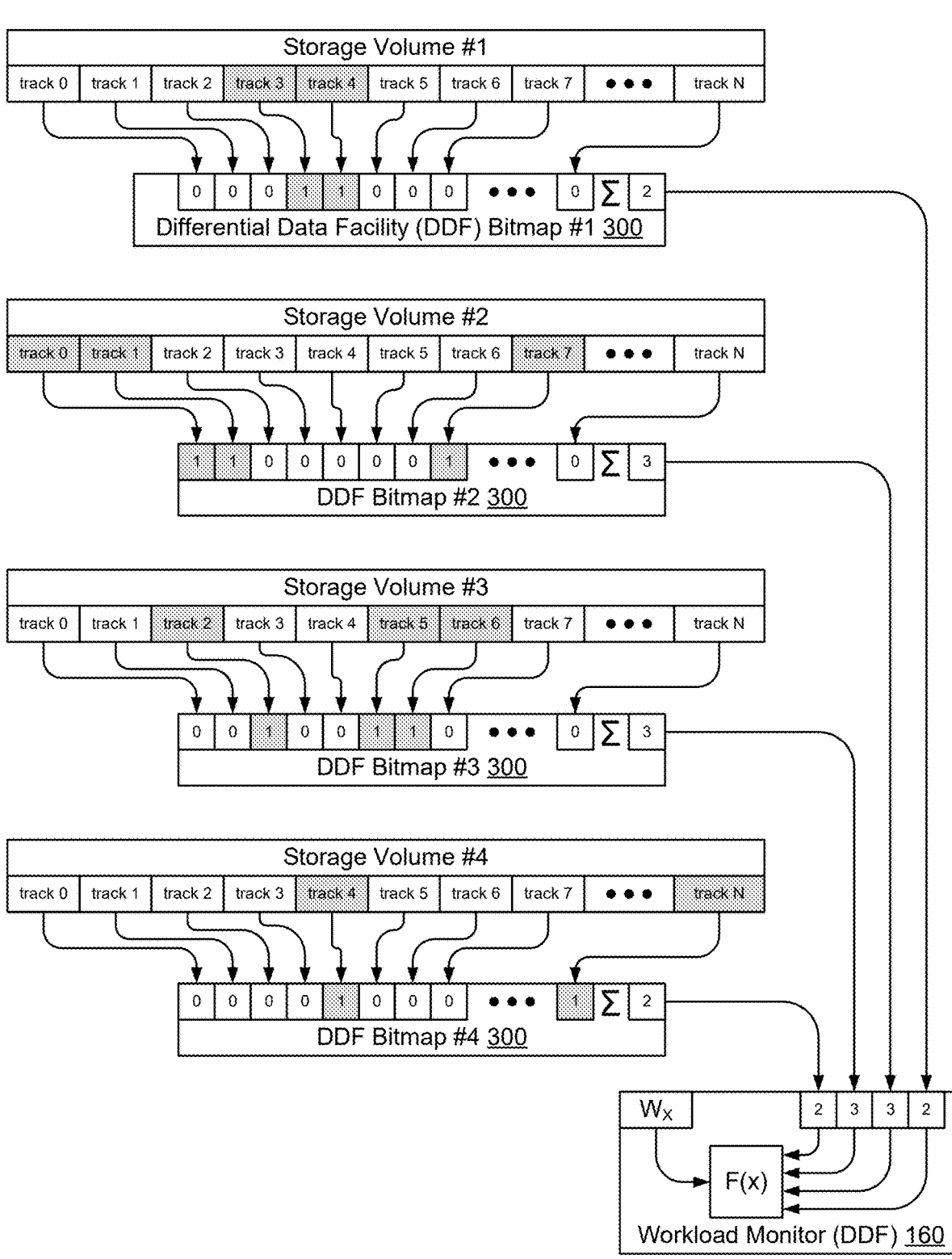
FIG. 3 is a block diagram of an example workload monitor configured to monitor write IO operations on a set of storage volumes of a storage volume monitoring (DDF) group, according to some embodiments.

FIG. 3 is a block diagram of an example workload monitor configured to monitor write IO operations on a set of storage volumes of a storage volume monitoring (DDF) group, according to some embodiments. As shown in FIG. 3, in some embodiments storage volumes are monitored using differential data facility sessions implemented using respective DDF bitmaps 300. Specifically, as shown in FIG. 3, in some embodiments a respective DDF bitmap 300 is associated with each storage volume, in which each track of the storage volume is represented by a respective bit in the DDF bitmap 300. In FIG. 3, for example, there are two tracks (colored gray) that received a write IO on storage volume #1 and, accordingly, bits for the corresponding tracks have been set to 1 in the DDF bitmap 300 for storage volume #1.

As shown in FIG. 3, in some embodiments the workload monitor 160 includes a summing function that sums the total number of bits that have been set in each of the DDF bitmaps 300 for each of the storage volumes of the storage volume monitoring group 165. The workload monitor 160 receives the sum of each DDF bitmap and applies a function f(x) to evaluate the DDF bitmap sums relative to one or more snapshot creation write IO threshold(s) Wx, to identify write IO activity on the storage volumes to trigger creation of snapshots of the set of storage volumes. After creation of a snapset, in some embodiments the DDF bitmaps are all reset to include all zeros to enable the DDF bitmaps to be used to identify tracks of data that have changed subsequent to creation of the snapset.

Figure 4:
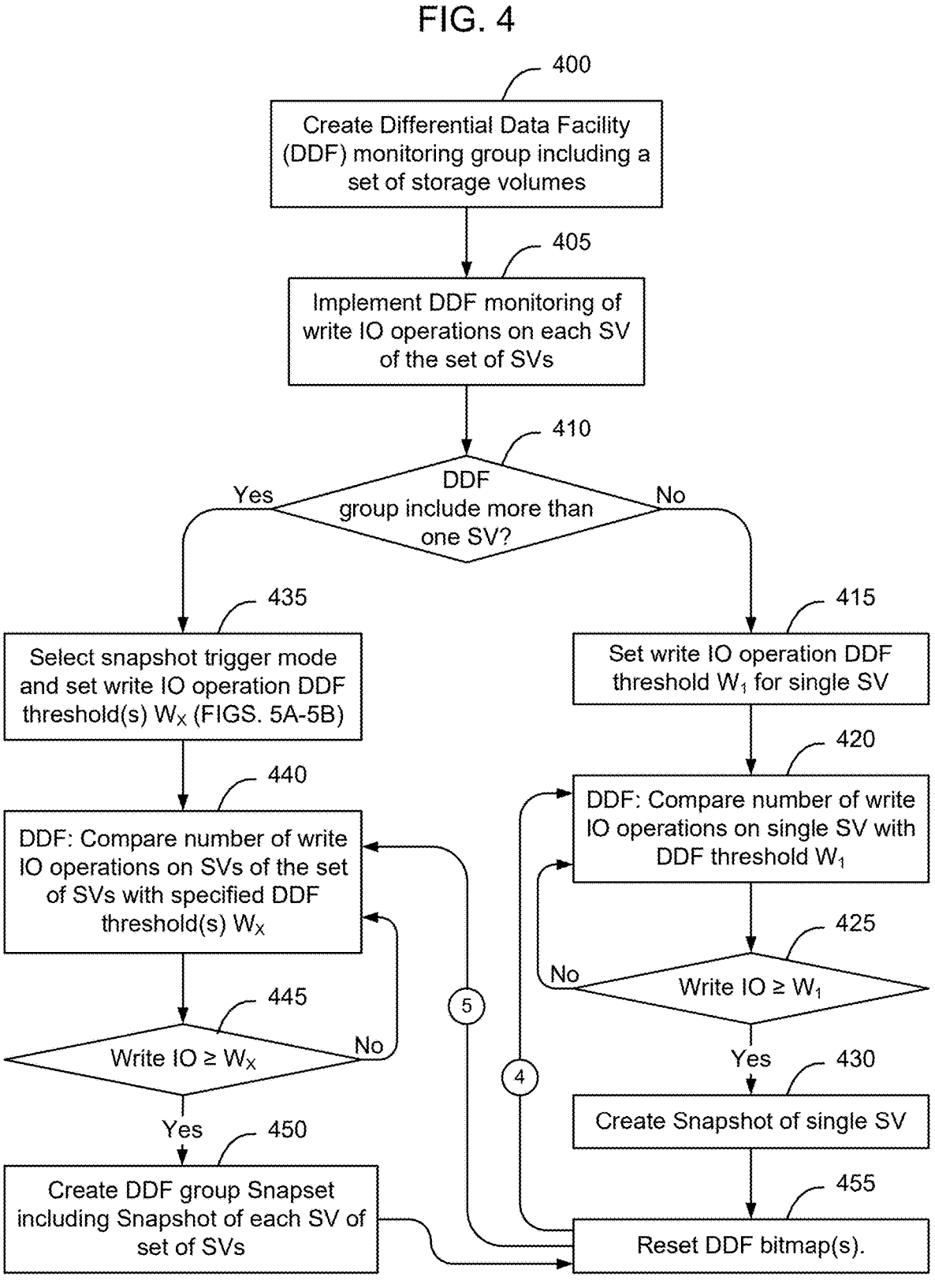
FIG. 4 is a flow chart of an example process of implementing activity-based snapshot creation, according to some embodiments.

FIG. 4 is a flow chart of an example process of implementing activity-based snapshot creation, according to some embodiments. As shown in FIG. 4, in some embodiments a differential data facility (DDF) monitoring group is created to include a set of storage volumes (block 400). The set of storage volumes might include a single storage volume or multiple storage volumes. After creation of the DDF monitoring group, a DDF session is used to implement DDF monitoring of write IO operations on each of the storage volumes of the set of storage volumes (block 405). For example, in some embodiments as shown in FIG. 3, a DDF bitmap is used to maintain information about tracks of data that have changed since creation of a previous snapshot. In some embodiments, the sums of the set bits of the DDF bitmaps are used by the workload monitoring system 160 to identify a number of changed tracks of each of the storage volumes.

As used herein, the term "number of write IO operations" is used to refer to write IO operations on unique tracks of the storage volumes. In some embodiments, as noted in connection with FIG. 3, the DDF bitmaps 300 identify a track as being changed if one or more write operations occur on the track since creation of a previous snapshot of the storage volume. It is possible that two or more write operations may occur on the same track of a storage volume. The first time a write IO operation occurs on the track, the bit for the corresponding track will be set to 1 in the DDF bitmap. If a subsequent write IO occurs on the same track before creation of a subsequent snapshot, the subsequent write IO operation will not result in any change to the DDF bitmap. Hence, the second or other subsequent write IO operation on the same track will not be captured by the workload monitor 160. However, for ease of description, this specification adopts the phrase "number of write IO operations" to refer to the number of tracks of a given storage volume that have been the target of one or more write operations since the last instance a snapshot was created.

As shown in FIG. 4, in some embodiments the workload monitor treats a DDF monitoring group having a single storage volume differently than a DDF monitoring group having more than one storage volume. Specifically, in instances where there is only one storage volume in a DDF monitoring group, there is only one way to count write IO operations on the storage volume. However, as described in greater detail in connection with FIGS. 5A-5B, in instances where there are multiple storage volumes in a DDF monitoring group, there are multiple ways to count write IO operations on the DDF monitoring group. For example, it is possible to count total write IO operations on the set of storage volumes, the number of write IO operations on individual storage volumes, and it is possible to use different functions f(x), resulting in multiple possible snapshot creation trigger modes.

Accordingly, as shown in FIG. 4, in some embodiments a determination is made as to whether the DDF monitoring group includes more than one Storage Volume (SV) (block 410). In response to a determination that the DDF monitoring group does not include more than one storage volume (a determination of NO at block 410), a snapshot creation write IO threshold $W_1$ is set for the single storage volume (block 415). In some embodiments, the snapshot creation write IO threshold W1 is a user-settable parameter that is specified by a user when setting a snapshot creation policy on the DDF monitoring group. The workload monitor 160 then compares the number of write IO operations on the single storage volume with the snapshot creation write IO threshold $W_1$ (block 420). In response to a determination that the number of write IO operations on the single storage volume is not greater than or equal to the snapshot creation write IO threshold $W_1$ (a determination of NO at block 425), the workload monitor 160 continues to monitor write IO operations on the storage volume (block 420). In response to a determination that the number of write IO operations on the single storage volume is greater than or equal to the snapshot creation write IO threshold $W_1$ (a determination of YES at block 425), the workload monitor 160 instructs the snapshot subsystem 155 to create a snapshot of the storage volume (block 430). In some embodiments, the DDF bitmap used by the workload monitor to monitor the number of write operations on the storage volume is also used by the snapshot subsystem to determine which tracks of the storage volume have changed since creation of a previous snapshot. In connection with creating the snapshot, the DDF bitmap is reset to include all zero values (block 455). The process then returns (FIG. 4, arrow 4) to block 420 to monitor write IO operations to determine activity on the storage volume to trigger creation of a subsequent snapshot.

In response to a determination that the DDF monitoring group includes more than one storage volume (a determination of YES at block 410), in some embodiments a snapshot creation trigger mode is selected, and a set of one or more snapshot creation write IO threshold values $W_X$ are specified (block 435). In some embodiments, the snapshot creation trigger mode is a user-settable parameter, and the set of one or more snapshot creation write IO threshold values $W_X$ are also user-settable parameters that are specified by a user when setting a snapshot creation policy on the DDF monitoring group. As discussed in greater detail in connection with FIGS. 5A-5B, in some embodiments example snapshot triggering modes include:

setting a snapshot creation write IO threshold based on a total number of write IO operations on the set of storage volumes that must occur prior to creation of a set of snapshots;

setting a snapshot creation write IO threshold based on an average number of write IO operations on the set of storage volumes that will trigger creation of a set of snapshots;

setting a snapshot creation write IO threshold based on a minimum number of write IO operations that must occur on each of the storage volumes of the set of storage volumes prior to creation of a set of snapshots;

setting a snapshot creation write IO threshold based on a maximum number of write IO operations that may occur on any one storage volume of the set of storage volumes and which will trigger creation of a set of snapshots; and setting a combination of snapshot creation write IO thresholds, for example to specify that a snapshot will be created when a minimum number of write IO operations occurs on every storage volume of the set of storage volumes, and that a snapshot will also be created if a maximum number of write IO operations occurs on any one of the storage volumes of the set of storage volumes.

In some embodiments, the snapshot triggering mode selected in block 435 is a user-settable parameter to provide the user with control over what types of activity patterns on the set of storage volumes of the storage volume monitoring group 165 should trigger creation of a set of snapshots of the set of storage volumes. In some embodiments, the snapshot triggering mode is a user-settable parameter that is selected for each differential data facility monitoring group of storage volumes. In some embodiments, the snapshot triggering mode is a user-settable parameter that is selected once and applied to multiple storage volume monitoring groups on the storage system. In some embodiments, the snapshot triggering mode is included as part of a snapshot policy that is applied to a storage volume monitoring group 165.

The workload monitor 160 then compares the number of write IO operations on the set of storage volumes with the snapshot creation write IO threshold(s) $W_X$ (block 440). In response to a determination that the number of write IO operations on the set of storage volumes is not greater than or equal to the snapshot creation write IO threshold(s) $W_X$ (a determination of NO at block 445), the workload monitor 160 continues to monitor the storage volumes (block 440). In response to a determination that the number of write IO operations on the set of storage volumes is greater than or equal to the snapshot creation write IO threshold(s) $W_X$ (a determination of YES at block 445), the workload monitor 160 instructs the snapshot subsystem 155 to create a snapset of the storage volumes of the storage volume monitoring group, the snapset including a snapshot of each of the storage volumes of the storage volume monitoring group (block 450). In some embodiments, the DDF bitmaps used by the workload monitor to monitor the number of write operations on the storage volumes are also used by the snapshot subsystem to determine which tracks of the storage volumes have changed since creation of a previous snapset. In connection with creating the snapset, the DDF bitmaps are reset to include all zero values (block 455). The process then returns to block 440 (FIG. 4, arrow 5) to monitor write IO operations to determine activity on the set of storage volumes to trigger creation of a subsequent snapset.

Figure 5B:
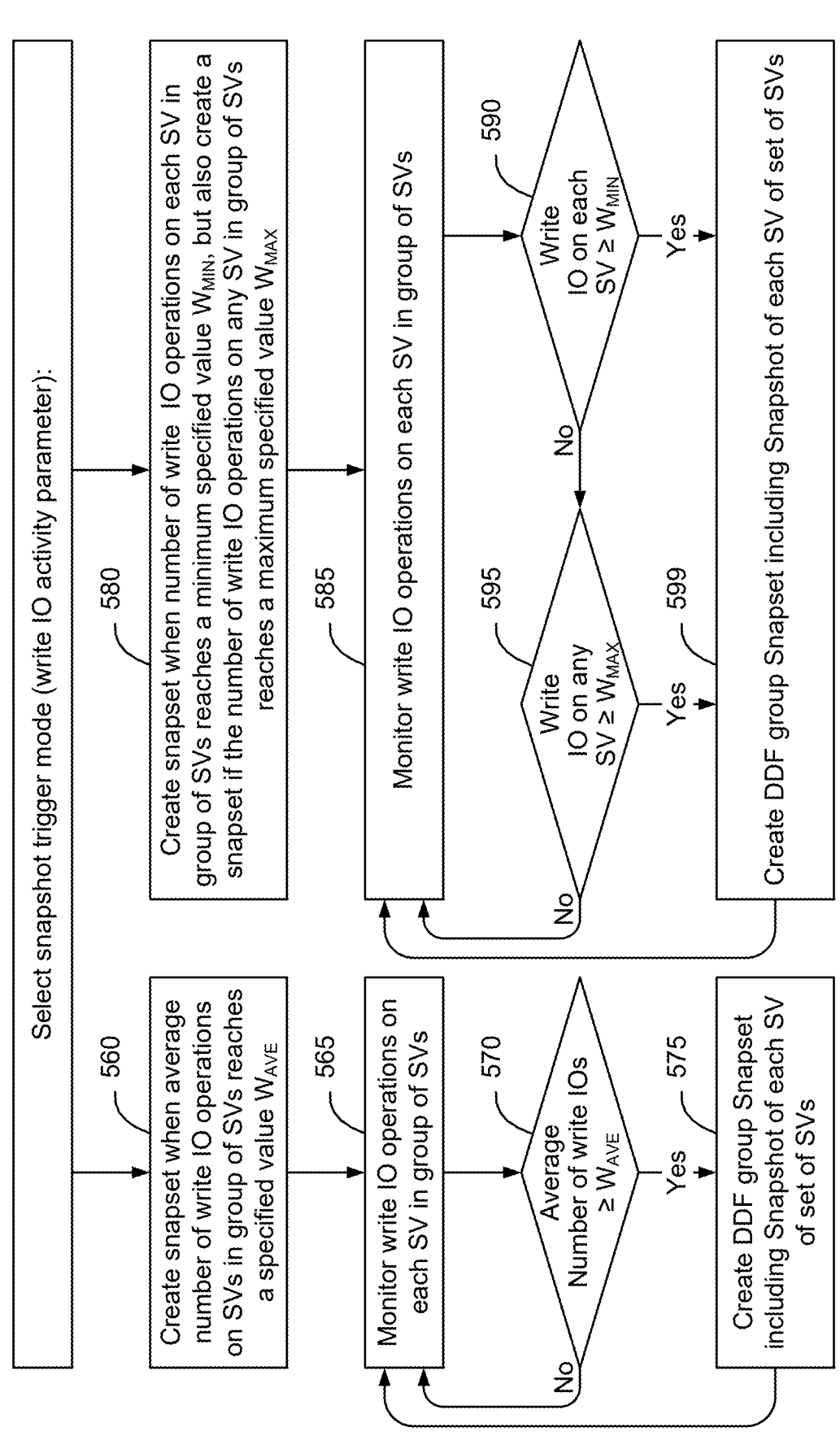

FIGS. 5A-5B are a flow chart of an example process of selecting a snapshot trigger mode corresponding to a write IO activity parameter to be monitored, setting corresponding write IO operation DDF thresholds $W_X$, and using the set write IO operation DDF thresholds $W_X$ in connection with implementing activity-based snapshot creation, according to some embodiments.

As shown in FIG. 5A, in some embodiments the selected snapshot trigger mode specifies the manner in which write IO operations should be counted on the storage volumes of the storage volume monitoring group 165. For example, in FIG. 5A, one of the snapshot trigger modes includes specifying that a snapset should be created when the total number of write IO operations on the set of storage volumes reaches a maximum total value $W_T$ (block 500). This snapshot trigger mode is shown, for example in FIG. 2, with the snapshot creation write IO threshold $W_T$=10. Other values of the snapshot creation write IO threshold $W_T$ may be selected, and 10 is merely shown for ease of illustration.

In this mode, once the snapshot creation write IO threshold $W_T$ has been specified, the write IO operations on each storage volume in the group of storage volumes is monitored (block 505). In response to a determination that the total number of write IO operations on the set of storage volumes in the storage volume monitoring group is not greater than or equal to the snapshot creation write IO threshold $W_T$ (a determination of NO at block 510), the workload monitor continues to monitor write IO operations on the set of storage volumes (block 505). In response to a determination that the total number of write IO operations on the set of storage volumes in the storage volume monitoring group is equal to or greater than the snapshot creation write IO threshold $W_T$ (a determination of YES at block 510), the workload monitor instructs the snapshot creation subsystem to create a snapset including a snapshot of each storage volume of the group of storage volumes (block 515).

As shown in FIG. 5A, in some embodiments another one of the snapshot trigger modes includes specifying that a snapset should be created when the number of write IO operations on any one of the storage volumes of the group of storage volumes reaches a maximum specified value $W_{MAX}$ (block 520). For example, using this snapshot trigger mode, a user could specify that a snapset should be created whenever any one of the storage volumes had received a snapshot creation write IO threshold $W_{MAX}$=10 (or some other user-specified number).

In this mode, once the snapshot creation write IO threshold $W_{MAX}$ has been specified (block 520), the write IO operations on each storage volume in the group of storage volumes is monitored (block 525). In response to a determination that the number of write IO operations on each of the storage volumes in the storage volume monitoring group is not greater than or equal to the snapshot creation write IO threshold $W_{MAX}$ (a determination of NO at block 530), the workload monitor continues to monitor write IO operations on the set of storage volumes (block 525). In response to a determination that the total number of write IO operations on any one of the storage volumes of the set of storage volumes in the storage volume monitoring group is equal to or greater than the snapshot creation write IO threshold $W_{MAX}$ (a determination of YES at block 530), the workload monitor instructs the snapshot creation subsystem to create a snapset including a snapshot of each storage volume of the group of storage volumes (block 535).

As shown in FIG. 5A, in some embodiments another one of the snapshot trigger modes includes specifying that a snapset should be created when the number of write IO operations on each of the storage volumes of the group of storage volumes reaches a minimum specified value $W_{MIN}$ (block 540). For example, using this snapshot trigger mode, a user could specify that a snapset should not be created until each storage volume of the set of storage volumes had received at least a minimum number of write IO operations, e.g. $W_{MIN}$=10 (or some other user-specified number).

In this mode, once the snapshot creation write IO threshold $W_{MIN}$ has been specified (block 540), the write IO operations on each storage volume in the group of storage volumes is monitored (block 545). In response to a determination that the number of write IO operations on each of the storage volumes in the storage volume monitoring group is not greater than or equal to the snapshot creation write IO threshold $W_{MIN}$ (a determination of NO at block 550), the workload monitor continues to monitor write IO operations on the set of storage volumes (block 545). In response to a determination that the number of write IO operations on each of the storage volumes of the set of storage volumes in the storage volume monitoring group is equal to or greater than the snapshot creation write IO threshold $W_{MIN}$ (a determination of YES at block 550), the workload monitor instructs the snapshot creation subsystem to create a snapset including a snapshot of each storage volume of the group of storage volumes (block 555).

As shown in FIG. 5B, in some embodiments another one of the snapshot trigger modes includes specifying that a snapset should be created when the average number of write IO operations on the set of storage volumes of the group of storage volumes reaches a minimum specified value $W_{AVE}$ (block 560). For example, using this snapshot trigger mode, a user could specify that a snapset should not be created until the number of write operations on the set of storage volumes has received an average number of write IO operations, e.g. $W_{AVE}$=10 (or some other user-specified number). Setting an average value as the snapshot creation write IO threshold $W_{AVE}$ (block 560) is similar to setting a maximum value as the snapshot creation write IO threshold $W_T$ (block 500) because the average is equal to the total number of write IO operations divided by the number of storage volumes in the storage volume monitoring group. Using an average value $W_{AVE}$ rather than a maximum total $W_T$ may be useful, for example, in instances where the number of storage volumes of the storage volume monitoring group may change over time. Using an average value $W_{AVE}$ rather than a maximum total $W_T$ may also be useful, for example, in instances where the snapshot creation write IO threshold is intended to be applied to multiple storage volume monitoring groups with different numbers of storage volumes.

As shown in FIG. 5B, once the snapshot creation write IO threshold $W_{AVE}$ has been specified (block 560), the write IO operations on each storage volume in the group of storage volumes is monitored (block 565). In response to a determination that the average number of write IO operations on the set of storage volumes in the storage volume monitoring group is not greater than or equal to the snapshot creation write IO threshold $W_{AVE}$ (a determination of NO at block 570), the workload monitor continues to monitor write IO operations on the set of storage volumes (block 565). In response to a determination that the average number of write IO operations on the set of storage volumes of the storage volume monitoring group is equal to or greater than the snapshot creation write IO threshold $W_{AVE}$ (a determination of YES at block 570), the workload monitor instructs the snapshot creation subsystem to create a snapset including a snapshot of each storage volume of the group of storage volumes (block 575).

As shown in FIG. 5B, in some embodiments another one of the snapshot trigger modes includes specifying a combination of snapshot creation write IO thresholds. In the example shown in FIG. 5B, the combination of write IO thresholds is specified such that a snapshot will be created whenever a minimum number of write IO operations occurs on every storage volume of the set of storage volumes ($W_{MIN}$), and that a snapshot will also be created if a maximum number of write IO operations occurs on any one of the storage volumes of the set of storage volumes ($W_{MAX}$) (block 580). Other combinations of write IO thresholds may be used as well depending on the implementation.

As shown in FIG. 5B, once the snapshot creation write IO thresholds $W_{MIN}$ and $W_{MAX}$ have been specified (block 580), the write IO operations on each storage volume in the group of storage volumes is monitored (block 585). In response to a determination that the total number of write IO operations on each of the storage volumes of the set of storage volumes in the storage volume monitoring group is equal to or greater than the snapshot creation write IO threshold $W_{MIN}$ (a determination of YES at block 590), the workload monitor instructs the snapshot creation subsystem to create a snapset including a snapshot of each storage volume of the group of storage volumes (block 599). Likewise, in response to a determination that the total number of write IO operations on any one of the storage volumes of the set of storage volumes in the storage volume monitoring group is equal to or greater than the snapshot creation write IO threshold $W_{MAX}$ (a determination of YES at block 595), the workload monitor instructs the snapshot creation subsystem to create a snapset including a snapshot of each storage volume of the group of storage volumes (block 599).

In response to a determination that the total number of write IO operations on each of the storage volumes in the storage volume monitoring group is not greater than or equal to the snapshot creation write IO threshold $W_{MIN}$ (a determination of NO at block 590), and in response to a determination that the total number of write IO operations on any one of the storage volumes in the storage volume monitoring group is not greater than or equal to the snapshot creation write IO threshold $W_{MAX}$ (a determination of NO at block 595), the workload monitor continues to monitor write IO operations on the set of storage volumes (block 585).

By creating snapsets of storage volumes of storage volume monitoring groups based on write IO activity on the storage volumes, it is possible to avoid creating unnecessary snapshots during periods of low activity. Likewise, by creating snapsets of storage volumes of storage volume monitoring groups based on write IO activity on the storage volumes, it is possible to ensure that frequent snapshots will be created during periods of high activity, thus providing better protection for the data that is stored in the set of storage volumes.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer-readable storage medium storing software for activity-based snapshot creation, the software comprising instructions executable by one or more computers which, upon such execution, cause the one or more computers to perform operations comprising:

defining a storage volume monitoring group, the storage volume monitoring group including a set of two or more storage volumes;

setting a snapset creation write IO threshold for the storage volume monitoring group, the snapset creation write IO threshold specifying a write IO activity parameter for the storage volume monitoring group such that satisfying the write IO activity parameter results in creation of a snapset of the storage volume monitoring group, the snapset including a respective snapshot of each storage volume of the set of two or more storage volumes of the storage volume monitoring group;

monitoring write IO operations on the set of storage volumes of the storage volume monitoring group;

comparing the monitored write IO operations with the snapset creation write IO threshold; and in response to a determination that the monitored IO operations on the set of storage volumes of the storage volume monitoring group satisfy the write IO activity parameter, causing the creation of the snapset;

wherein causing the creation of the snapset comprises creating the respective snapshot of each storage volume of the set of two or more storage volumes of the storage volume monitoring group.

2. The non-transitory tangible computer-readable storage medium of claim 1, wherein the write IO activity parameter is a maximum total number of write IO operations on the set of two or more storage volumes; and wherein, in response to a determination that the monitored write IO operations on the set of two or more storage volumes of the storage volume monitoring group is equal to or greater than the maximum total number of write IO operations, causing the creation of a set of snapshots of the two or more storage volumes of the storage volume monitoring group.

3. The non-transitory tangible computer-readable storage medium of claim 1, wherein the write IO activity parameter is an average number of write IO operations on the set of two or more storage volumes; and wherein, in response to a determination that the monitored IO operations on the set of two or more storage volumes of the storage volume monitoring group is equal to or greater than the average number of write IO operations, causing the creation of a set of snapshots of the two or more storage volumes of the storage volume monitoring group.

4. The non-transitory tangible computer-readable storage medium of claim 1, wherein the write IO activity parameter is a maximum number of write IO operations that may occur on any one of the set of two or more storage volumes; and wherein, in response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

5. The non-transitory tangible computer-readable storage medium of claim 1, wherein the write IO activity parameter is a minimum number of write IO operations that must occur on each storage volume of the set of two or more storage volumes; and wherein, in response to a determination that the monitored IO operations on each storage volume of the set of two or more storage volumes of the storage volume monitoring group is equal to or greater than the minimum number of write IO operations, causing the creation of a set of snapshots of the two or more storage volumes of the storage volume monitoring group.

6. The non-transitory tangible computer-readable storage medium of claim 1, wherein the write IO activity parameter is a combination of a minimum number of write IO operations that must occur on each storage volume of the set of two or more storage volumes or a maximum number of write IO operations that may occur on any one of the set of two or more storage volumes; and wherein, in response to a determination that the monitored IO operations on each storage volume of the set of two or more storage volumes of the storage volume monitoring group is equal to or greater than the minimum number of write IO operations, or in response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

7. The non-transitory tangible computer-readable storage medium of claim 1, wherein the write IO activity parameter for the storage volume monitoring group is a user-settable parameter.

8. The non-transitory tangible computer-readable storage medium of claim 1, wherein monitoring write IO operations on the set of storage volumes of the storage volume monitoring group comprises implementing a bitmap for each storage volume, with each bit of a respective bitmap representing a track of the storage volume, and wherein a respective bit of the bitmap is changed in response to a determination that an initial write IO has occurred on the respective track of the storage volume.

9. The non-transitory tangible computer-readable storage medium of claim 8, wherein the bits of the bitmap identify tracks of the storage volumes that have changed since creation of a previous set of snapshots of the storage volumes of the storage volume monitoring group; and wherein the bitmaps are reset after creation of the set of snapshots of the storage volumes of the storage volume monitoring group.

10. A system for activity-based snapshot creation, comprising:

one or more processors and one or more storage devices storing instructions that are operable, when executed by the one or more processors, to cause the one or more processors to perform operations comprising:

defining a storage volume monitoring group, the storage volume monitoring group including a set of two or more storage volumes;

setting a snapset creation write IO threshold for the storage volume monitoring group, the snapset creation write IO threshold specifying a write IO activity parameter for the storage volume monitoring group such that satisfying the write IO activity parameter results in creation of a snapset of the storage volume monitoring group, the snapset including a respective snapshot of each storage volume of the set of two or more storage volumes of the storage volume monitoring group;

monitoring write IO operations on the set of storage volumes of the storage volume monitoring group;

comparing the monitored write IO operations with the snapset creation write IO threshold; and in response to a determination that the monitored IO operations on the set of storage volumes of the storage volume monitoring group satisfy the write IO activity parameter, causing the creation of the snapset;

wherein causing the creation of the snapset comprises creating the respective snapshot of each storage volume of the set of two or more storage volumes of the storage volume monitoring group.

11. The system of claim 10, wherein the write IO activity parameter is a maximum total number of write IO operations on the set of two or more storage volumes; and wherein, in response to a determination that the monitored write IO operations on the set of two or more storage volumes of the storage volume monitoring group is equal to or greater than the maximum total number of write IO operations, causing the creation of a set of snapshots of the two or more storage volumes of the storage volume monitoring group.

12. The system of claim 10, wherein the write IO activity parameter is an average number of write IO operations on the set of two or more storage volumes; and wherein, in response to a determination that the monitored IO operations on the set of two or more storage volumes of the storage volume monitoring group is equal to or greater than the average number of write IO operations, causing the creation of a set of snapshots of the two or more storage volumes of the storage volume monitoring group.

13. The system of claim 10, wherein the write IO activity parameter is a maximum number of write IO operations that may occur on any one of the set of two or more storage volumes; and wherein, in response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

14. The system of claim 10, wherein the write IO activity parameter is a minimum number of write IO operations that must occur on each storage volume of the set of two or more storage volumes; and wherein, in response to a determination that the monitored IO operations on each storage volume of the set of two or more storage volumes of the storage volume monitoring group is equal to or greater than the minimum number of write IO operations, causing the creation of a set of snapshots of the two or more storage volumes of the storage volume monitoring group.

15. The system of claim 10, wherein the write IO activity parameter is a combination of a minimum number of write IO operations that must occur on each storage volume of the set of two or more storage volumes or a maximum number of write IO operations that may occur on any one of the set of two or more storage volumes; and wherein, in response to a determination that the monitored IO operations on each storage volume of the set of two or more storage volumes of the storage volume monitoring group is equal to or greater than the minimum number of write IO operations, or in response to a determination that the monitored IO operations on any one storage volume of the set of two or more storage volumes of the storage volume monitoring group is equal to or greater than the maximum number of write IO operations, causing the creation of a set of snapshots of the two or more storage volumes of the storage volume monitoring group.

16. The system of claim 10, wherein the write IO activity parameter for the storage volume monitoring group is a user-settable parameter.

17. The system of claim 10, wherein monitoring write IO operations on the set of storage volumes of the storage volume monitoring group comprises implementing a bitmap for each storage volume, with each bit of a respective bitmap representing a track of the storage volume, and wherein a respective bit of the bitmap is changed in response to a determination that an initial write IO has occurred on the respective track of the storage volume.

18. The system of claim 17, wherein the bits of the bitmap identify tracks of the storage volumes that have changed since creation of a previous set of snapshots of the storage volumes of the storage volume monitoring group; and wherein the bitmaps are reset after creation of the set of snapshots of the storage volumes of the storage volume monitoring group.

* * * * *